United States Patent [19]

Kajimura et al.

[11] Patent Number: 4,671,929
[45] Date of Patent: Jun. 9, 1987

[54] AUSTENITIC STAINLESS STEEL WITH IMPROVED RESISTANCE TO CORROSION BY NITRIC ACID

[75] Inventors: Haruhiko Kajimura, Nishinomiya; Hiroo Nagano; Minoru Miura, both of Kobe, all of Japan

[73] Assignee: Sumitomo Metal Industries, Ltd., Osaka, Japan

[21] Appl. No.: 635,104

[22] Filed: Jul. 27, 1984

[30] Foreign Application Priority Data

Aug. 5, 1983 [JP] Japan .................. 58-142517

[51] Int. Cl.$^4$ .................. C22C 38/40; C22C 30/00
[52] U.S. Cl. .................. 420/44; 420/51; 420/50; 420/48; 420/584; 420/54; 148/327; 376/900
[58] Field of Search .................. 420/584, 586, 452; 148/38, 37; 75/128 C, 128 A, 128 G, 128 T; 376/900

[56] References Cited

U.S. PATENT DOCUMENTS 4,171,218 10/1979 Hoshino et al. .................. 75/128 C
4,201,574 5/1980 Kowaka et al. .................. 148/38
4,279,648 7/1981 Ito et al. .................. 75/128 A Primary Examiner—Melvyn J. Andrews
Assistant Examiner—Deborah Yee
Attorney, Agent, or Firm—Burns, Doane, Swecker & Mathis

[57] ABSTRACT

An austenitic stainless steel exhibiting improved resistance to corrosion caused by nitric acid is disclosed, which consists essentially of:

C: not more than 0.03% by weight, Si: 2-6% by weight,
Mn: 0.1-8% by weight, Cr: 20-35% by weight,
Ni: 17-50% by weight, Mg: not more than 0.02%,
at least one of Nb, Ti and Ta in the total amount of $8 \times C(\%)$ or more, but 1.0% by weight or less,
S: not more than 0.003% by weight,
Oxygen: not more than 0.003% by weight,
N: not more than 0.03% by weight,
P: not more than 0.02% by weight,
Fe and incidental impurities: balance the composition further satisfying the following relationships;

$-10 \leq Ni(Bal) \leq -0.1$
$Cr(\%) \geq (7/4)Si(\%) + 16.5$
$Mg(\%) - 0.75 \times S(\%) - 1.5 \times Oxygen(\%) \geq 0$
wherein, $Ni(Bal) = 30 \times C(\%) + 0.5 \times Mn(\%) + Ni(\%) + 8.2 - 1.1 \times [1.5 \times Si(\%) + Cr(\%)]$.

15 Claims, 4 Drawing Figures

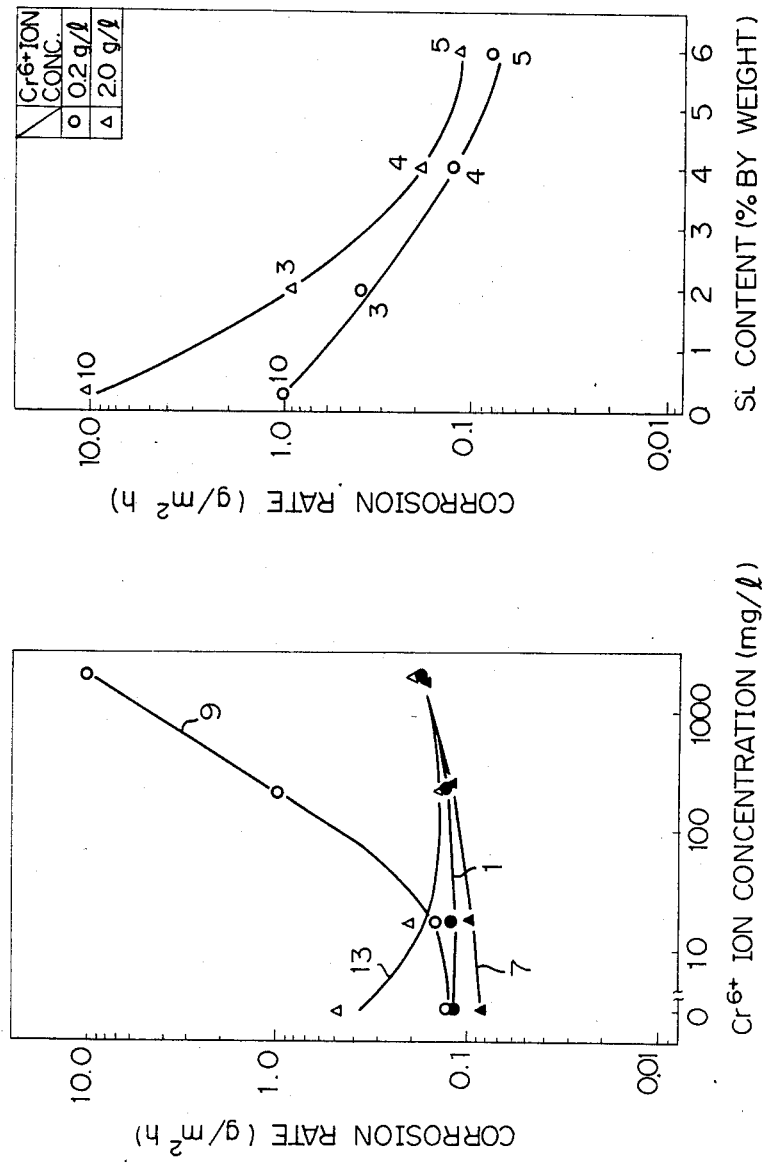

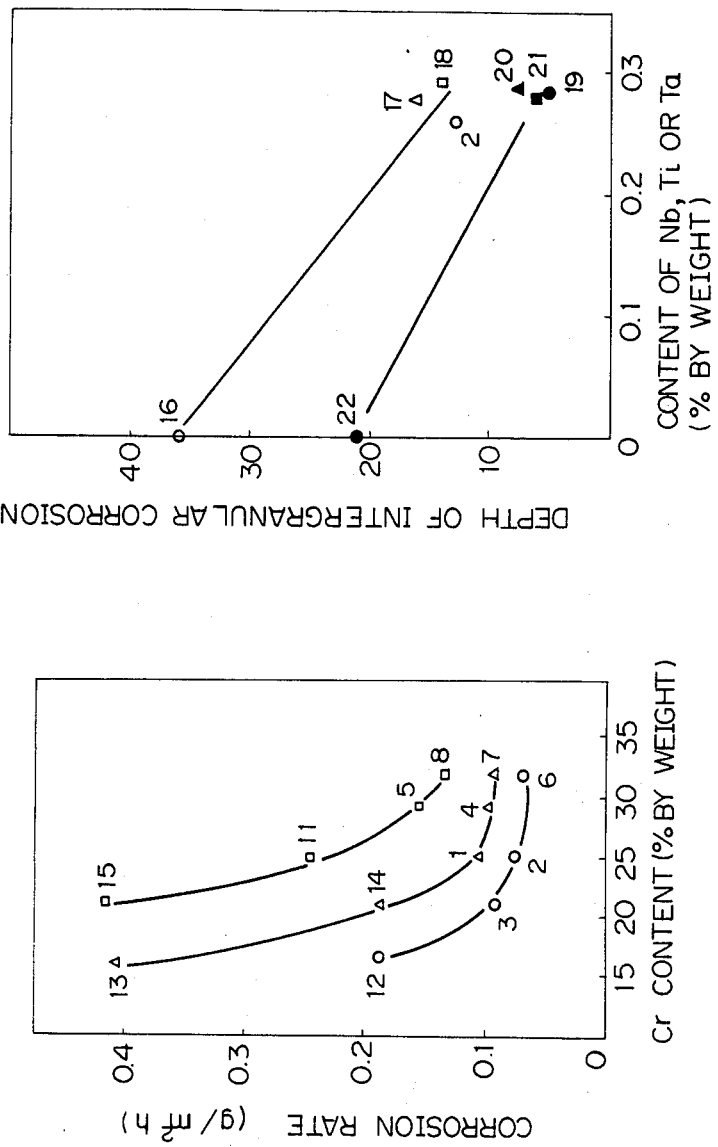

AUSTENITIC STAINLESS STEEL WITH IMPROVED RESISTANCE TO CORROSION BY NITRIC ACID

BACKGROUND OF THE INVENTION

This invention relates to an austenitic stainless steel exhibiting improved resistance to corrosion caused by nitric acid, and particularly to such an austenitic stainless steel as that used for structural members in the construction of an apparatus for chemically reprocessing spent nuclear fuels.

Chemical treatment of the spent nuclear fuel of light-water reactors is carried out under high temperature, nitric acid-containing environments, and such 25% Cr-20% Ni base alloys as URANUS 65 (tradename) have been used as a structual material therefor. However, the degree of corrosion resistance which 25% Cr-20% Ni base alloys can exhibit is not satisfactory under medium or high concentrations of nitric acid or when the corrosive environment further contains $Cr^{6+}$ ions. It has also been proposed to use 17% Cr-14% Ni-4% Si base steels and 8% Cr-20% Ni-6% Si base steels under such highly corrosive environments, although these materials do not exhibit satisfactory resistance to corrosion even under conditions containing high or medium concentrations of nitric acid, either. Even more they do not exhibit corrosion resistance under environments where $Cr^{6+}$ ions are also contained, since the $Cr^{6+}$ ions act as an oxidizing agent to markedly accelerate the intergranular corrosion.

Japan Laid-Open patent specification No. 124820/1979 discloses 25% Cr-20% Ni-4% Si-0.25% N base alloys in which nitrogen is intentionally incorporated so as to improve the resistance to corrosion. However, the corrosion resistance is not satisfactory under corrosive conditions containing an oxidizing agent such as $Cr^{6+}$ ions which accelerate the intergranular corrosion.

Thus, a metallic material which exhibits satisfactory levels of corrosion resistance in the presence of $Cr^{6+}$ ions in nitric acid solutions has not yet been developed.

Now many nuclear power plants are in operation, and a relatively large amount of the total power supply has come from light-water nuclear reactors. It has also been necessary to reprocess a large amount of the spent nuclear fuels from these reactors with nitric acid solutions. What this means is that there is a need in the art for a material which can exhibit improved resistance to corrosion under nitric acid-containing environments. It is also required that structural members for an apparatus used in reprocessing spent nuclear fuels, having a long, continuous service life be provided.

Materials and articles made thereof which meet the above need should satisfy the following requirements:

(1) First, they must exhibit improved resistance to corrosion, particularly to corrosion by nitric acid;

(2) Second, they must also exhibit satisfactory resistance against any increase in corrosion rates or acceleration of intergranular corrosion, which are caused by increases in corrosion potential due to contamination from $Cr^{6+}$ ions or from an oxidizing agent from nuclear fuels such as Ru; and (3) Third, they must suppress any degradation in the corrosion resistance of welds by avoiding becoming sensitized during welding. This is because welding is widely used in the construction of these apparatuses.

OBJECTS OF THE INVENTION

The object of this invention is to provide an austenitic stainless steel and an article made thereof for use in the construction of an apparatus for reprocessing spent nuclear fuels, the material exhibiting not only improved weldability, but also improved corrosion resistance in the presence or absence of an oxidizing agent such as $Cr^{6+}$ ions in nitric acid solutions.

SUMMARY OF THE INVENTION

The inventors of this invention found that the corrosion resistance, particularly resistance to intergranular corrosion of 25% Cr-20% Ni base steel is markedly improved even in the presence of $Cr^{6+}$ ions under corrosive environments containing medium or high concentrations of nitric acid by adding Si in relatively large amounts while adjusting the Cr and Ni content thereof.

Thus, this invention resides in an austenitic stainless steel exhibiting improved resistance to corrosion under conditions containing nitric acid, which consists essentially of:

C: not more than 0.03%, Si: 2-6%,
Mn: 0.1-8%, Cr: 20-35%,
Ni: 17-50%, Mg: not more than 0.02%,
at least one of Nb, Ti and Ta in the total amount of 8×(C %) or more, but not more than 1.0%,
S: not more than 0.003%, Oxygen: not more than 0.003%,
N: not more than 0.03%, P: not more than 0.02%,
Fe: balance with incidental impurities, the composition further satisfying the following relationships;

$-10 \leq Ni(Bal) \leq -0.1$
$Cr(\%) \geq (7/4)Si(\%) + 16.5$
$Mg(\%) - 0.75 \times S(\%) - 1.5 \times Oxygen(\%) \geq 0$
wherein, $Ni(Bal) = 30 \times C(\%) + 0.5 \times Mn(\%) + Ni(\%) + 8.2 - 1.1 \times [1.5 \times Si(\%) + Cr(\%)]$.

In a preferable embodiment, the steel of this invention comprises 17-35% by weight of nickel and 20-28% by weight of chromium.

In a further preferable embodiment of this invention, the steel comprises 3-4% by weight of silicon, 20-28% by weight of nickel and 22-26% by weight of chromium.

Advantageously, the metallic materials of this invention are used under corrosive nitric acid-containing environments which further contain an oxidizing agent such as $Cr^{6+}$ ions to accelerate the corrosion.

In another aspect, this invention resides in an article made of the metallic material mentioned above, which is used as a structural member for use in the construction of an apparatus for reprocessing spent nuclear fuels.

BRIEF DESCRIPTION OF THE DRAWINGS

FIG. 1 is a graph showing a relationship between the corrosion rate and the concentration of $Cr^{6+}$ ions;

FIG. 2 is a graph showing a relationship between the corrosion rate and the Si content;

FIG. 3 is a graph showing a relationship between the corrosion rate and the Cr content; and FIG. 4 is a graph showing a relationship between the depth of intergranular corrosion and the content of Nb, Ti or Ta.

DETAILED DESCRIPTION OF THE PREFERRED EMBODIMENTS

The reasons why the steel composition of this invention is defined as in the above will be explained hereinafter in detail. Unless otherwise indicated, the term "%" means "% by weight" in this specification.

C (carbon):

Since carbon accelerates sensitiveness to intergranular corrosion, it is necessary to restrict the carbon content to a level as low as possible in order to improve the intergranular corrosion resistance. When carbon is added in an amount of more than 0.03%, the resistance to intergranular corrosion is not improved any more even if stabilizing agents such as Nb, Ti and Ta are added. Therefore, the upper limit of carbon is defined as 0.03%, preferably 0.02%.

Si (silicon):

It is necessary to incorporate 2% or more of silicon, preferably 2.5% or more of silicon in order to achieve satisafactory corrosion resistance even under environments of nitric acid solutions containing $Cr^{6+}$ ions. Whereas in a mere nitric acid solution which is free of contamination from $Cr^{6+}$ ions the corrosion resistance will be degraded as the silicon content increases, and the content of Cr as well as Ni has to be increased so as to compensate for the degradation in corrosion resistance. This will result in not only increases in manufacturing costs, but also deterioration in weldability. The upper limit of the silicon, therefore, is defined as 6% in this invention. In a specific example, the Si content may be restricted to 3–4% by weight.

MN (manganese):

Manganese is added in an amount of 0.1–8% as a deoxidizing agent and as an austenite-stabilizing agent. When manganese is added as an oxidizing agent, the manganese may be added in an amount of 2% or less. Manganese may be added, however, as an austenite-stabilizing agent in an amount of more than 2%, but of 8% or less, and the addition of manganese in an amount of not more than 8% is effective in further improving the corrosion resistance. However, when it is added in an amount of more than 8%, the workability deteriorates. The upper limit of manganese is defined as 8% in this invention.

Cr (chromium):

In order to improve the corrosion resistance of a high Si material in a nitric acid solution, it is necessary to increase the amount of chromium as well as that of silicon.

According to this invention, therefore, it is desirable to add chromium in an amount of 20% or more. The more chromium is added, the more nickel is required to ensure the formation of an austenite phase deteriorating weldability and increasing manufacturing costs. The upper limit of chromium is, therefore, defined as 35% in this invention. Advantageously, the Cr content is 20–28%. More advantageously, it is 22–26%.

The amounts of Cr and Si should satisfy the following relationship:

$Cr(\%) \geq (7/4)Si(\%) + 16.5$

This is because a satisfactory level of corrosion resistance cannot be obtained when the amount of Cr is less than $(7/4)Si(\%) + 16.5$.

Ni (nickel):

It is necessary to incorporate nickel in an amount of 17–50% so as to provide an austenitic structure containing 0.5–15% by volume of ferrite. The presence of such an amount of ferrite is necessary to obtain satisfactory weldability and is achieved by adjusting the incorporation of Si as well as Cr in this invention. The nickel balance [Ni(Bal)] required to provide 0.5–15% by volume of ferrite is from $-10.0$ to $-0.1$; $-10.0 \leq Ni(Bal) \leq -0.1$, wherein the nickel balance is defined as follows:

$Ni(bal) = 30 \times C(\%) + 0.5 \times Mn(\%) + Ni(\%) + 8.2 - 1.1 \times [1.5 \times Si(\%) + Cr(\%)]$ The nickel content is desirably 17–35%, more desirably 20–28%.

Nb, Ti, Ta (niobium, titanium, tantalum):

These elements may stabilize the carbon in a steel to improve the intergranular corrosion resistance. For this purpose, at least one of Nb, Ti, and Ta is added in the total amount of eight times or more, preferably ten times or more of the carbon content, C(%). However, in view of the required level of weldability the upper limit of these elements is 1.0%.

P (phosphorous):

It is desirable to limit the phosphorous content to a level as low as possible so as to improve the intergranular corrosion resistance. Acccordingly, the phosphorous content is restricted to 0.02% or less.

S (sulfur):

It is desirable to restrict the sulfur content to a level as low as possible so as to further improve the intergranular corrosion resistance. In this invention the presence of sulfur is restricted to not more than 0.003%.

Mg (magnesium):

Magnesium may fix sulfur in a steel to improve the intergranular corrosion resistance. However, when it is added in an amount of more than 0.02%, hot workability deteriorates, resulting in cracking during welding. Thus, according to this invention, the magnesium content is restricted to not more than 0.02%. Preferably, the lower limit thereof is defined by the following equation:

$Mg - 0.75 \times S(\%) - 1.5 \times Oxygen(\%) \geq 0$

Oxygen:

It is desirable to reduce the amount of oxygen to a low level so as to reduce the amount of inclusions. Thus, this invention restricts the oxygen content to 0.003% or less.

N (nitrogen):

Nitrogen is present in an amount of not more than 0.03% as an incidental impurity.

The following examples are presented as specific illustrations of this invention. It should be understood, however, that this invention is not limited to the specific details set forth in the examples.

EXAMPLES

A variety of steels having the steel compositions shown in Table 1 below were prepared and were subjected to heat treatment under conditions including heating at 1100° C. for 30 minutes followed by water cooling and then heating at 650° C. for 30 hours followed by air cooling. This heat treatment was applied so as to sensitize the steels just like those steels found in the heat-affected zones after welding. The resulting test steels were then further subjected to a corrosion test using a nitric acid solution in the presence or absence of $Cr^{6+}$ ions. The corrosion test was carried out in an 8N-$HNO_3$ nitric acid solution and in an 8N-$HNO_3$ solution containing 0.3 g/l $Cr^{6+}$ ions. The test pieces were immersed into a boiling solution of these nitric acid solutions for 48 hours.

The test results are summarized by graphs in FIGS. 1 through 4. Numeral reference figures in these graphs indicate the steel number shown in Table 1.

FIG. 1 is a graph showing an influence of the Si content as well as the Cr content on the corrosion rate in an 8N-HNO$_3$ solution containing Cr$^{6+}$ ions. In the case of 0.25% Si test steels shown by Steel No. 9 and symbol "O" in the figure, the corrosion rate markedly increases with an increase in Cr$^{6+}$ ion concentration. However, in the other cases wherein 4% Si is added, the corrosion rate is not influenced so much as in Steel No. 9 by the Cr$^{6+}$ ion concentration. This means that the addition of Si is effective in improving the corrosion resistance under corrosive conditions containing Cr$^{6+}$ ions.

When Cr is added to steels in an amount of 17% as shown by Steel No. 13 and symbol "Δ", the corrosion resistance under corrosive conditions containing HNO$_3$, but free from Cr$^{6+}$ ions is not satisfactory even for 4% Si steels, but when the Cr content increases to 25%, as shown by Steel No. 1 and symbol " ", and to 32%, as shown by Steel No. 7 and symbol " ", the corrosion resistance under these conditions does not deteriorate. Thus, it can be said from the above that Si-added steels can show further improved resistance to corrosion by nitric acid in the presence of Cr$^{6+}$ ions as the Cr content increases.

The amount of Ni in Steel No. 1 is relatively larger than Steel No. 2. This is because such a greater amount of nickel is necessary to make the structure austenitic.

FIG. 2 shows a relationship between the corrosion rate and the silicon content in an 8N-NHO$_3$ solution containing Cr$^{6+}$ ions. It is apparent from the graphs that the corrosion rate decreases as the silicon content increases, regardless of the concentration of Cr$^{6+}$ ions. When the silicon content is 2% or more, preferably 2.5% or more, a satisfactory level of corrosion resistance is obtained.

FIG. 3 is also a graph showing an influence of the Cr content on the corrosion rate in an 8N-NHO$_3$ solution for Si-added test steel materials. In the figure the symbol "O" indicates the case where 2% Si was added, the symbol "Δ" indicates 4% Si, and the symbol "□" shows the case where 6% Si was added. It is apparent from the graphs that when the amount of the Si added is as small as 2% (Steel Nos. 2, 3, 6, and 12), the corrosion rate is markedly decreased when 20% or more of Cr is added, that when the amount of the Si added is in an amount of 4% (Steel Nos. 1, 4, 7, 13 and 14), the corrosion rate is markedly decreased when 23% or more, preferably 22% or more of Cr is added and that when the amount of the Si added is in an amount of 6% (Steel Nos. 5, 8, 11 and 15), the corrosion rate is markedly decreased when 27% or more of Cr is added.

FIG. 4 is a graph showing an influence of the content of stabilizing elements on the depth of intergranular corrosion under corrosive conditions of an 8N-HNO$_3$ solution containing Cr$^{6+}$ ions. In the figure, the symbols "O" and "●" indicate the cases where Nb was added, the symbols "Δ" and "▲" Ti, and the symbols "□" and "■" indicate where Ta was added. It is apparent from the figure that the addition of at least one of these stabilizing elements is effective to improve corrosion resistance.

Although this invention has been described with preferred embodiments it is to be understood that variations and modifications may be employed without departing from the concept of the invention as defined in the following claims.

TABLE 1

| Steel No. | C | Si | Mn | P | S | Ni | Cr | Nb | Ti | Ta | Mg | O | N | Ni (Bal) | Remarks |
|---|---|---|---|---|---|---|---|---|---|---|---|---|---|---|---|
| 1 | 0.007 | 4.10 | 0.61 | 0.014 | 0.002 | 23.18 | 24.89 | 0.27 | — | — | 0.010 | 0.001 | 0.010 | −2.2 | Invention |
| 2 | 0.015 | 2.20 | 0.59 | 0.014 | 0.002 | 20.63 | 25.01 | 0.26 | — | — | 0.009 | 0.002 | 0.020 | −1.6 | |
| 3 | 0.011 | 2.15 | 0.64 | 0.015 | 0.001 | 17.28 | 20.92 | 0.25 | — | — | 0.011 | 0.001 | 0.015 | −0.4 | |
| 4 | 0.010 | 4.05 | 0.63 | 0.013 | 0.002 | 27.72 | 28.16 | 0.27 | — | — | 0.012 | 0.001 | 0.017 | −1.1 | |
| 5 | 0.007 | 5.96 | 0.63 | 0.012 | 0.002 | 30.62 | 28.02 | 0.24 | — | — | 0.011 | 0.002 | 0.020 | −1.3 | |
| 6 | 0.012 | 2.07 | 0.65 | 0.015 | 0.001 | 26.78 | 31.51 | 0.25 | — | — | 0.011 | 0.001 | 0.018 | −2.4 | |
| 7 | 0.023 | 4.07 | 0.71 | 0.014 | 0.002 | 31.08 | 32.31 | 0.26 | — | — | 0.010 | 0.001 | 0.021 | −2.1 | |
| 8 | 0.018 | 5.92 | 7.21 | 0.013 | 0.002 | 30.27 | 31.63 | 0.25 | — | — | 0.010 | 0.001 | 0.022 | −1.9 | |
| 9 | 0.013 | 0.25 | 0.65 | 0.015 | 0.002 | 8.16 | 18.21 | 0.28 | — | — | 0.010 | 0.004 | 0.016 | −3.4 | Comparative |
| 10 | 0.035 | 0.26 | 0.64 | 0.010 | 0.003 | 17.31 | 25.20 | 0.31 | — | — | 0.011 | 0.002 | 0.014 | −1.3 | |
| 11 | 0.022 | 5.86 | 0.67 | 0.014 | 0.004 | 26.96 | 25.17 | 0.26 | — | — | 0.012 | 0.001 | 0.017 | −1.2 | |
| 12 | 0.010 | 2.09 | 0.62 | 0.012 | 0.002 | 12.11 | 17.21 | 0.24 | — | — | 0.025 | 0.001 | 0.019 | −1.5 | |
| 13 | 0.009 | 4.16 | 0.59 | 0.011 | 0.001 | 14.56 | 17.16 | 0.25 | — | — | 0.010 | 0.002 | 0.018 | −2.4 | |
| 14 | 0.008 | 4.15 | 0.57 | 0.013 | 0.002 | 20.02 | 21.07 | 0.26 | — | — | 0.009 | 0.001 | 0.018 | −1.3 | |
| 15 | 0.011 | 5.88 | 0.62 | 0.013 | 0.001 | 22.72 | 20.93 | 0.24 | — | — | 0.009 | 0.001 | 0.016 | −1.2 | |
| 16 | 0.015 | 2.11 | 0.70 | 0.015 | 0.001 | 21.18 | 25.21 | — | — | — | 0.008 | 0.002 | 0.015 | −1.0 | |
| 17 | 0.013 | 2.01 | 0.67 | 0.013 | 0.001 | 20.27 | 25.18 | — | 0.28 | — | 0.009 | 0.001 | 0.012 | −1.8 | Invention |
| 18 | 0.012 | 2.18 | 0.69 | 0.013 | 0.001 | 20.38 | 25.08 | — | — | 0.29 | 0.010 | 0.002 | 0.016 | −1.9 | |
| 19 | 0.014 | 3.88 | 0.65 | 0.014 | 0.001 | 20.10 | 25.12 | 0.28 | — | — | 0.009 | 0.001 | 0.011 | −5.8 | |
| 20 | 0.013 | 3.98 | 0.62 | 0.012 | 0.001 | 20.16 | 25.02 | — | 0.29 | — | 0.008 | 0.001 | 0.014 | −5.0 | |
| 21 | 0.014 | 3.96 | 0.66 | 0.015 | 0.001 | 20.06 | 25.04 | — | — | 0.28 | 0.009 | 0.001 | 0.013 | −5.1 | |
| 22 | 0.014 | 3.95 | 0.62 | 0.015 | 0.001 | 20.51 | 24.95 | — | — | — | 0.009 | 0.001 | 0.014 | −4.9 | Comparative |

What is claimed is:

1. An austenitic stainless steel exhibiting improved resistance to corrosion caused by nitric acid, which consists essentially of:
C: not more than 0.03% by weight, Si: 2–6% by weight,
Mn: 0.1–8% by weight, Cr: 20–35% by weight,
Ni: 17–50% by weight, Mg: not more than 0.02%,
at least one of Nb, Ti and Ta in the total amount of 8×C(%) or more, but 1.0% by weight or less,
S: not more than 0.003% by weight,
Oxygen: not more than 0.003% by weight,
N: not more than 0.03% by weight,
P: not more than 0.02% by weight, Fe and incidental impurities: balance the composition further satisfying the following relationships;

$-10 \leq Ni(Bal) \leq -0.1$ $Cr(\%) \geq (7/4)Si(\%) + 16.5$ $Mg(\%) - 0.75 \times S(\%) - 1.5 \times Oxygen(\%) \geq 0$ wherein, $Ni(Bal) = 30 \times C(\%) + 0.5 \times Mn(\%) + Ni(\%) + 8.2 - 1.1 \times [1.5 \times Si(\%) + Cr(\%)]$.

2. An austenitic stainless steel exhibiting improved resistance to corrosion caused by nitric acid, as defined in claim 1, in which:
Si: 2.5–6% by weight.

3. An austenitic stainless steel exhibiting improved resistance to corrosion caused by nitric acid, as defined in claim 1, in which:
Si: 3–4% by weight.

4. An austenitic stainless steel exhibiting improved resistance to corrosion caused by nitric acid, as defined in claim 1, in which the manganese content is more than 2.0% by weight, but not more than 8%.

5. An austenitic stainless steel exhibiting improved resistance to corrosion caused by nitric acid, as defined in claim 1, in which:
Ni: 20–28% by weight.

6. An austenitic stainless steel exhibiting improved resistance to corrosion caused by nitric acid, as defined in claim 1, in which:
Si: 3–4% by weight,
Ni: 20–28% by weight.

7. An austenitic stainless steel exhibiting improved resistance to corrosion caused by nitric acid, as defined in claim 1, in which at least one of Nb, Ti and Ta is added in the total amount of $10 \times C(\%)$ or more, but not more than 1.0% by weight.

8. An article useful as a structural member for use in the construction of an apparatus for reprocessing spent nuclear fuels, said member being made of an austenitic stainless steel exhibiting improved resistance to corrosion caused by nitric acid, which consists essentially of:

C: not more than 0.03% by weight, Si: 2–6% by weight,
Mn: 0.1–8% by weight, Cr: 20–35% by weight,
Ni: 17–50% by weight, Mg: not more than 0.02%,
at least one of Nb, Ti and Ta in the total amount of $8 \times C(\%)$ or more, but 1.0% by weight or less,
S: not more than 0.003% by weight,
Oxygen: not more than 0.003% by weight,
N: not more than 0.03% by weight,
P: not more than 0.02% by weight,
Fe and incidental impurities: balance the composition further satisfying the following relationships;

$-10 \leq Ni(Bal) \leq -0.1$ $Cr(\%) \geq (7/4)Si(\%) + 16.5$ $Mg(\%) - 0.75 \times S(\%) - 1.5 \times Oxygen(\%) \geq 0$ wherein, $Ni(Bal) = 30 \times C(\%) + 0.5 \times Mn(\%) + Ni(\%) + 8.2 - 1.1 \times [1.5 \times Si(\%) + Cr(\%)]$.

9. An article, as defined in claim 8, in which:
Si: 2.5–6% by weight.

10. An article, as defined in claim 8, in which:
Si: 3–4% by weight.

11. An article, as defined in claim 8, in which the manganese content is more than 2.0% by weight, but not more than 8%.

12. An article, as defined in claim 8, in which:
Ni: 20–28% by weight.

13. An article, as defined in claim 8, in which:
Si: 3–4% by weight,
Ni: 20–28% by weight.

14. An article, as defined in claim 8, in which at least one of Nb, Ti and Ta is added in the total amount of $10 \times C(\%)$ or more, but not more than 1.0% by weight.

15. In the construction of an apparatus for reprocessing spent nuclear fuels containing structural members, the improvement which comprises using as a structural member in the apparatus the article of claim 8.

* * * * *